(12) United States Patent
Vermeulen et al.

(10) Patent No.: US 12,060,625 B2
(45) Date of Patent: Aug. 13, 2024

(54) PROCESS FOR THE RECOVERY OF METALS FROM COBALT-BEARING MATERIALS

(71) Applicant: Umicore, Brussels (BE)

(72) Inventors: Isabel Vermeulen, Olen (BE); Harald Oosterhof, Olen (BE); Luc Coeck, Olen (BE); Elien Haccuria, Olen (BE); Tijl Crivits, Olen (BE); Thomas Suetens, Olen (BE); Michael Baltes, Olen (BE)

(73) Assignee: Umicore, Brussels (BE)

( * ) Notice: Subject to any disclaimer, the term of this patent is extended or adjusted under 35 U.S.C. 154(b) by 301 days.

(21) Appl. No.: 16/754,786

(22) PCT Filed: Oct. 22, 2018

(86) PCT No.: PCT/EP2018/078896
§ 371 (c)(1),
(2) Date: Apr. 9, 2020

(87) PCT Pub. No.: WO2019/081432
PCT Pub. Date: May 2, 2019

(65) Prior Publication Data
US 2020/0299804 A1    Sep. 24, 2020

(30) Foreign Application Priority Data

Oct. 27, 2017  (EP) .................................. 17198908

(51) Int. Cl.
*C22B 3/00*  (2006.01)
*B22F 9/08*  (2006.01)

(52) U.S. Cl.
CPC .......... *C22B 23/0484* (2013.01); *B22F 9/082* (2013.01); *B22F 2301/15* (2013.01)

(58) Field of Classification Search
None
See application file for complete search history.

(56) References Cited

U.S. PATENT DOCUMENTS

| | | | | |
|---|---|---|---|---|
| 2,772,959 A | * | 12/1956 | Lichty ................... | C22B 23/023 75/10.63 |
| 5,749,939 A | * | 5/1998 | Kundrat ................ | C21C 7/0006 75/416 |
| 2009/0087361 A1 | | 4/2009 | Rishea et al. | |
| 2009/0208405 A1 | * | 8/2009 | Osborne ................ | C01B 13/18 423/594.19 |
| 2009/0249921 A1 | | 10/2009 | Osborne et al. | |
| 2011/0118100 A1 | | 5/2011 | Ratchev et al. | |
| 2016/0355906 A1 | | 12/2016 | Vaughan et al. | |
| 2017/0152585 A1 | * | 6/2017 | Takahashi ............... | C21B 15/00 |

FOREIGN PATENT DOCUMENTS

| | | | | |
|---|---|---|---|---|
| CN | 1153221 A | | 7/1997 | |
| CN | 101480631 A | | 7/2009 | |
| CN | 102251097 A | * | 11/2011 | |
| CN | 103526035 A | * | 1/2014 | |
| CN | 103952564 A | | 7/2014 | |
| CN | 106148699 A | | 11/2016 | |
| CN | 111996377 A | * | 11/2020 | |
| DE | 250137 | * | 9/1987 | |
| GB | 247634 A | | 2/1926 | |
| KR | 20070046990 A | * | 5/2007 | |
| WO | 9720954 A1 | | 6/1997 | |
| WO | 2009100495 A1 | | 8/2009 | |
| WO | WO-2015007658 A1 | * | 1/2015 | ............. C22B 23/02 |
| WO | WO-2016013355 A1 | * | 1/2016 | ............. C21B 15/00 |
| WO | 2017096525 A1 | | 6/2017 | |

OTHER PUBLICATIONS

KR 2007-046990 machine translation (Year: 2007).*
CN 103526035 machine translation (Year: 2014).*
Niemela et al. Production, characteristics and use of ferrochromium slags. The Indian Ferro Alloy Producers Association. INFACON XI 2007. 171-179. (Year: 2007).*
WO 2015007658 machine translation (Year: 2015).*
DD 250137 machine translation (Year: 1987).*
CN 111996377 machine translation (Year: 2020).*
CN 102251097 machine translation (Year: 2011).*
ISA/EP; International Search Report and Written Opinion for International Patent Application No. PCT/EP2018/078896 dated Dec. 17, 2018, 9 pages.
Hawkins, M.J., et al., "Recovering cobalt from primary and secondary sources", Journal of Minerals, Metals and Materials Society, Oct. 1, 1998, pp. 46-50.

* cited by examiner

*Primary Examiner* — Paul A Wartalowicz
*Assistant Examiner* — Stephani Hill
(74) *Attorney, Agent, or Firm* — NK Patent Law

(57) ABSTRACT

A process is divulged for recovering metals from a metal-bearing material containing, in oxidized form, more than 1% of Co, a total of Co and Ni of more than 15%, and more than 1% Mg, comprising smelting said metal-bearing material in a bath furnace together with slag formers, thereby producing an alloy phase with more than 80% of the Co, and less than 1% of the Mg, and a slag phase, by applying reducing smelting conditions, and by selecting CaO, $SiO_2$, and $Al_2O_3$ as slag formers, in amounts to obtain a final slag composition according to the ratio's $0.25<SiO_2/Al_2O_3<2.5$, $0.5<SiO_2/CaO<2.5$, and $MgO>10\%$; and separating the alloy phase from the slag phase. This process ensures quantitative recovery of Co in an alloy phase along with other metals such as Ni, while collecting Mg into a slag.

7 Claims, No Drawings

PROCESS FOR THE RECOVERY OF METALS FROM COBALT-BEARING MATERIALS

CROSS-REFERENCE TO RELATED APPLICATIONS

This application is a U.S. National Stage application of International Patent Application No. PCT/EP2018/078896, filed on Oct. 22, 2018, which claims the benefit of European Patent Application No. 17198908.0, filed on Oct. 27, 2017.

The present disclosure concerns a process for the recovery of cobalt from cobalt-bearing materials.

The rising demand for electric vehicles has initiated the booming of the lithium ion battery market. Cobalt and nickel are some of the most important metals that are used for the production of these rechargeable batteries, and the demand for these metals is therefore also growing fast.

Approximately half of the world's cobalt reserves are located in the African Copper belt which straddles the border of Zambia and the Democratic Republic of Congo. In this region, cobalt is made available as a by-product of the copper industry: the ore deposits typically contain 4-5% copper, while only 0.2-0.4% cobalt is present. The cobalt recovery plants usually get their feed from a bleed of the copper refining circuits. Bleed streams typically contain a few grams per liter of cobalt, and some nickel, together with a number of impurities that are, to a certain extent, removed on-site by means of a neutralization step. The resulting cobalt-bearing products are the so-called Mixed Hydroxide Precipitates (MHP).

The production of MHP is state of the art throughout the African Copper belt. In most cases, milk of magnesia (MgO) is used for the precipitation of cobalt hydroxide, according to the reaction:

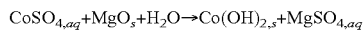

$CoSO_{4,aq} + MgO_s + H_2O \rightarrow Co(OH)_{2,s} + MgSO_{4,aq}$

In practice, MHP obtained according to the above reaction typically also contain basic sulfates and partially oxidized species, such as oxy-hydroxides, of the precipitated metals. Aside from cobalt, they may contain appreciable quantities of nickel, copper, or of other valuable metals.

The MHP are usually transported to specialized plants for the purification and recovery of the contained valuable metals.

In rare occasions, lime (CaO) precipitation is used instead of magnesia. The MHP are then however diluted with gypsum, which in turn leads to higher transportation and treatment costs, and additional purification requirements.

The precipitation with magnesia is however not without disadvantages. The obtained MHP are usually contaminated with a significant amount of magnesium. The presence of magnesium in the precipitate has a deleterious effect on the downstream refining flowsheet, in particular with respect to the production of high-purity cobalt salts, hydroxides or metal.

In most cases, critical purity requirements are dictated by the battery industry, which is absorbing a growing percentage of the global cobalt production. Because of these purity requirements, intricate processing routes have been developed, involving for example selective precipitation, solvent extraction and ion exchange. Most of these routes are rendered even more complex and expensive when they have to cope with the interference of magnesium.

Nevertheless, a few processes are known wherein magnesia is separated upfront of the refining steps. This approach avoids the interference of magnesium during the cobalt refining.

US2009249921A1 teaches slagging of magnesia in cobalt-nickel compounds using slag compositions based on silica/lime or silica/alumina. The process is limited to the solid state reduction of metals, a process also known as direct reduction. A subsequent melting operation is optionally performed for the purpose of separating the alloy from the slag.

WO2009100495 teaches a bath smelting process for nickel products, producing molten nickel, by controlling the chemistry of the slag so as to have a high solubility for contaminants present in the nickel product. Contaminants are defined as magnesium, calcium, cobalt, copper, manganese, silicon, sulfur, phosphorus, and aluminum in elemental form and as compounds.

The process according to the present invention also realizes the upfront separation of magnesia. But in contrast to the prior art, the invention allows for the simultaneous valorization of cobalt, and of nickel if present, in a molten metallic phase, while collecting the magnesia in a slag.

To this end, a process has been developed for the recovery of metals from a metal-bearing material containing, in oxidized form, more than 1% Co, a total of Co and Ni of more than 15%, and more than 1% Mg, comprising the steps of:

smelting said metal-bearing material in a bath furnace together with slag formers, thereby producing an alloy phase with more than 80%, preferably more than 90% of the Co, and less than 1% of the Mg, and a slag phase, by applying reducing smelting conditions, and by selecting CaO, $SiO_2$, and $Al_2O_3$ as slag formers, in amounts so as to obtain a final slag composition according to the ratio's $0.25<SiO_2/Al2O_3<2.5$, $0.5<SiO_2/CaO<2.5$, and to MgO>10%; and, separating the alloy phase from the slag phase.

All percentages are expressed by weight, after drying at 120° C.

By "metal-bearing material in oxidized form" is meant that the metals therein are in an oxidation state higher than zero.

During the smelting process, Co and Ni will be collected in the alloy, while Mg will be concentrated in the slag as MgO, where after these phases are separated, e.g. by selective tapping after settling.

The skilled person knows how to obtain the required reducing smelting conditions, namely by the addition of a sufficient amount of reducing agents such as, but not limited to, natural gas, oil, and coal. Highly reducing conditions whereby Si starts to report to the alloy are not to be favored as the presence of Si in the alloy may complicate the Co purification process.

The minimum concentration of 1% Co is preferred to ensure the economical worthiness of the recovery process. Lower Co contents would render the Co—Mg interference problem less relevant as there would be insufficient economic incentive to recover and refine the Co from those materials.

A minimum concentration of 15% for the total of Co and Ni is preferred as this will generate a sufficient quantity of alloy during the smelting operation to allow for easy selective tapping metal-bearing material. Typical MHP contain this level of metals.

The process is characterized by a Co yield to the alloy of more than 80% in particular when dealing with materials with relatively low Co content, or of more than 90% in particular when dealing with materials with higher Co contents. The above-mentioned reducing conditions allow for such yields to be achieved without inducing the undesired reduction of Si. Under such conditions, less than 1% of the Mg reports to the alloy. Mg in the alloy is thus essentially avoided, as more than 99% of the Mg reports to the slag.

Depending on the technology used to feed the metallurgical charge to the furnace, a small fraction of the materials may be directly entrained by the off gases leaving the furnace. This fraction, if present, never reaches the molten bath, effectively bypassing the smelting step. This fraction is therefore not accounted for when considering the yields of Mg and of Co.

The proposed quaternary system of $Al_2O_3$—$SiO_2$—CaO—MgO is selected so as to obtain a slag with a relatively low viscosity. When a slag composition is chosen in such a way that its viscosity is below 1500 cP, fragmented material can then be fed directly to the bath, as it will be readily wetted and incorporated into the slag. Charge pretreatment steps like adding a binder to form agglomerates are then made unnecessary.

When using the proposed quaternary slag system, an MgO concentration in the slag of more than 10% can be reached. The higher the MgO concentration in the slag, the less amount of slag is needed to dissolve a given quantity of MgO. Metal losses in the slag are therefore lower.

Even more preferred slag compositions are those containing less than 35% of CaO as this improves the kinetics of the MgO dissolution in the slag.

In a further embodiment, the metal-bearing material comprises MHP. The most valuable metals therein are Co and Ni. Other elements are present, but are considered as impurities.

In a further embodiment, the smelting step is the only smelting step of a complete Co valorization process starting from MHP.

Limiting the valorization process to a single smelting step is desirable for economic reasons. By smelting step is meant a pyro-metallurgical process such as calcining, roasting, smelting, and refining, performed at high temperatures. In this context, high temperatures are temperatures precluding the presence of liquid water. By complete Co valorization process is meant the process starting from MHP and ending with a Co compound having a degree of purity compatible with its intended use.

In a further embodiment, the process additionally comprises a step of granulation or atomization of the alloy phase.

Granulation, and preferably atomization, is indeed useful to enhance the kinetics of the leaching step that would typically be needed when performing the refining steps using hydrometallurgical unit operations.

In a further embodiment, the metal-bearing material is obtained according to a process comprising the steps of:
feeding Co-bearing ores or concentrates to a leaching reactor;
leaching the ores or the concentrates in acidic conditions, thereby obtaining a Co-bearing mother liquor;
precipitating Co from the mother liquor by using MgO, thereby obtaining a metal-bearing material containing, in oxidized form more than 1% Co, and more than 1% Mg.

The process of the separation of the MgO from MHP is indeed most suitably combined with the upfront processes leading to such MgO-contaminated MHP.

In a further embodiment, the process comprises the further steps of:

leaching the granulated or atomized alloy phase in acidic conditions, thereby obtaining a Co-bearing leach solution;
purifying the leach solution by extracting or removing impurities from the solution, thereby obtaining a purified solution;
recovering Co from the purified solution.

The present process, when including the step of granulating or atomizing the alloy, is most suitable for the further valorization of the contained cobalt using hydrometallurgical techniques. Indeed, thanks to the absence of Mg, less impurities must be extracted or otherwise removed from the Co-bearing solution. This contrast with the situation where Mg would be present in solution, as the only practical purification scheme then involves the selective extraction of the cobalt from the solution, which is a much more complicated and expensive process.

EXAMPLE

Mixed hydroxide precipitates (MHP) typically contain 50% or more of free moisture. Partial drying is needed before feeding such materials to a smelting furnace. The MHP are thus first dried to a moisture content of about 20%. Drying to lower moisture levels is not recommended as this would render the product too dusty for safe handling.

The composition of the MHP used as a starting product is shown in Table 1. The composition is expressed w.r.t. to product dried at 120° C.

TABLE 1

| | Composition of MHP | | | | | | | |
|---|---|---|---|---|---|---|---|---|
| INPUT (wt. %) | Al | Si | Ca | Mg | Fe | Co | Cu | Ni |
| MHP | 0.02 | 1.2 | 0.0 | 4.6 | 0.0 | 40.2 | 0.7 | 0.1 |

A mixture is prepared consisting of 1000 g MHP, 360 g cokes, 400 g ferro slag, and 100 g $Al_2O_3$ as fluxing agent. No pretreatment such as agglomeration or the use of binders is involved. The ferro slag is of the commonly available type produced in the blast furnace of ironmaking processes.

The mixture is melted in a boron nitride coated alumina crucible with a volume of 1 L. A temperature of 1500° C. is maintained using an induction furnace. When melted, 4 stepwise additions of 100 g MHP are made to the crucible.

Once all material is added, a fixed oxygen partial pressure is enforced by blowing a mixture of 130 l/h of CO and 6 l/h for 1 h into the bath. This results in the establishment of a proper equilibrium redox potential ($pO_2$). The skilled person will easily achieve the same redox potential at industrial scale using other commonly available reducing agents such as natural gas, oil, and coal.

After this, the melt is allowed to decant for 15 minutes. The good fluidity of the slag allows for an efficient decantation, i.e. without residual alloy droplets floating in the slag. After cooling, an alloy-slag phase separation is performed manually whereupon both phases are analyzed.

A detailed material balance is provided in Table 2.

TABLE 2

Detailed material balance of the smelting operation

| | Mass (g) | Al | Si | Ca | Mg | Fe | Co | Cu | Ni |
|---|---|---|---|---|---|---|---|---|---|
| Input (wt. %) | | | | | | | | | |
| MHP | 1400.0 | 0.02 | 1.2 | 0.0 | 4.6 | 0.0 | 40.2 | 0.7 | 0.1 |
| Slag | 400.00 | 3.1 | 16.0 | 24.7 | 3.9 | 2.7 | 0.0 | 0.8 | 0.2 |
| Al$_2$O$_3$ | 100.00 | 52.9 | 0.0 | 0.0 | 0.0 | 0.0 | 0.0 | 0.0 | 0.0 |
| Input (g) | | | | | | | | | |
| MHP | 1400.0 | 0.2 | 16.2 | 0.0 | 64.1 | 0.6 | 562.3 | 9.9 | 1.1 |
| Slag | 400.0 | 12.2 | 64.0 | 98.6 | 15.6 | 10.9 | 0.0 | 3.2 | 0.8 |
| Al$_2$O$_3$ | 100.0 | 52.9 | 0.0 | 0.0 | 0.0 | 0.0 | 0.0 | 0.0 | 0.0 |
| Total | 1900.0 | 65.3 | 80.3 | 98.6 | 79.7 | 11.4 | 562.3 | 13.1 | 1.9 |
| Output (wt. %) | | | | | | | | | |
| Alloy | 650.0 | 0.0 | 0.0 | 0.0 | 0.0 | 1.1 | 93.5 | 1.9 | 0.3 |
| Slag | 660.0 | 10.0 | 12.1 | 15.1 | 11.0 | 0.5 | 1.1 | 0.0 | 0.0 |
| Water | 590.0 | 0.0 | 0.0 | 0.0 | 0.0 | 0.0 | 0.0 | 0.0 | 0.0 |
| Output (g) | | | | | | | | | |
| Alloy | 650.0 | 0.0 | 0.2 | 0.0 | 0.0 | 7.2 | 607.8 | 12.4 | 2.0 |
| Slag | 660.0 | 66.0 | 79.9 | 99.7 | 72.6 | 3.3 | 7.3 | 0.3 | 0.0 |
| Water | 590.0 | 0.0 | 0.0 | 0.0 | 0.0 | 0.0 | 0.0 | 0.0 | 0.0 |
| Total | 1900.0 | 66.0 | 80.0 | 99.7 | 72.6 | 10.5 | 615.0 | 12.6 | 2.0 |
| Distribution (wt. %) | | | | | | | | | |
| Alloy | 34.2 | 0.0 | 0.2 | 0.0 | 0.0 | 68.4 | 98.8 | 97.8 | 99.9 |
| Slag | 34.7 | 100.0 | 99.8 | 100.0 | 100.0 | 31.6 | 1.2 | 2.2 | 0.1 |
| Total | 68.9 | 100.0 | 100.0 | 100.0 | 100.0 | 100.0 | 100.0 | 100.0 | 100.0 |

The slag has a SiO$_2$/Al$_2$O$_3$ ratio of 0.7, and a SiO$_2$/CaO ratio of 1.2. The Mg and Ca concentrations of respectively 11% and 15% correspond to 18.2% of MgO and 21.1% of CaO.

The Co yield to the alloy amounts to 98.8%, while the Mg yield to the slag amounts to 100%. An Mg free alloy is thus obtained.

The invention claimed is:

1. A process for recovering metals from a metal-bearing material comprising Mixed Hydroxide Precipitates (MHP), wherein the MHP comprises, in oxidized form, more than 1 wt. % Co, a total of Co and Ni of more than 15 wt. %, and more than 1 wt. % Mg, the process comprising the steps:
smelting said metal-bearing material in a bath furnace together with slag formers, wherein smelting comprises applying reducing smelting conditions to produce an alloy phase and a slag phase, wherein the alloy phase comprises more than 80 wt. % of the Co and less than 1 wt. % of the Mg, and
selecting CaO, SiO$_2$, and Al$_2$O$_3$ as slag formers in amounts to obtain a final slag composition having the ratios:
25<SiO$_2$/Al$_2$O$_3$<2.5,
0.5<SiO$_2$/CaO<2.5, and
MgO>10 wt. %; and
separating the alloy phase from the slag phase.

2. The process according to claim 1, wherein the smelting step is the only smelting step of a complete Co valorization process starting from MHP.

3. The process according to claim 1, further comprising a step of granulation or atomization of the alloy phase.

4. The process according to claim 1, wherein the metal-bearing material is obtained according to a process comprising:
feeding Co-bearing ores or concentrates to a leaching reactor;
leaching the ores or the concentrates in acidic conditions, thereby obtaining a Co-bearing mother liquor; and
precipitating Co from the mother liquor by using MgO, thereby obtaining a metal-bearing material comprising Mixed Hydroxide Precipitates (MHP), wherein the MHP comprises, in oxidized form, more than 1 wt. % Co, a total of Co and Ni of more than 15 wt. %, and more than 1 wt. % Mg.

5. The process according to claim 3, further comprising:
leaching the granulated or atomized alloy phase in acidic conditions, thereby obtaining a Co-bearing leach solution;
purifying the leach solution by extracting or removing impurities from the solution, thereby obtaining a purified solution; and
recovering Co from the purified solution.

6. The process according to claim 1, wherein the alloy phase comprises more than 90 wt. % of the Co.

7. The process according to claim 1, wherein charge pretreatment steps comprising adding a binder, agglomeration, or a combination thereof are not included in the process.

* * * * *